United States Patent
Lan et al.

(10) Patent No.: US 8,823,295 B2
(45) Date of Patent: Sep. 2, 2014

(54) ELECTRICAL SYSTEM ASSEMBLY OF ELECTRIC AUTOMOBILE AND ENERGY SYSTEM AND ACTUATING DEVICE THEREOF

(71) Applicant: Suzhou Eagle Electric Vehicle Manufacturing Co., Ltd., Suzhou (CN)

(72) Inventors: Ke Lan, Suzhou (CN); Weiping Li, Suzhou (CN)

(73) Assignee: Suzhou Eagle Electric Vehicle Manufacturing Co., Ltd., Suzhou (CN)

( * ) Notice: Subject to any disclaimer, the term of this patent is extended or adjusted under 35 U.S.C. 154(b) by 0 days.

(21) Appl. No.: 13/955,295

(22) Filed: Jul. 31, 2013

(65) Prior Publication Data

US 2013/0314006 A1 Nov. 28, 2013

Related U.S. Application Data

(63) Continuation of application No. PCT/CN2011/001131, filed on Jul. 8, 2011.

(30) Foreign Application Priority Data

Mar. 4, 2011 (CN) .......................... 2011 1 0052266
Mar. 4, 2011 (CN) .......................... 2011 1 0052267
Mar. 9, 2011 (CN) .......................... 2011 1 0055633

(51) Int. Cl.
*H02P 31/00* (2006.01)
*H02J 7/00* (2006.01)
*B60L 11/18* (2006.01)

(52) U.S. Cl.
USPC ........................... 318/139; 318/650; 318/671

(58) Field of Classification Search
CPC ......... H02P 4/00; H02P 7/00; H02P 2006/00; H02P 2007/00; H02P 2007/0088; H02P 2007/01; Y02T 10/90; Y02T 30/40
USPC ......... 318/139, 471, 479, 504, 565, 650, 671; 388/909
See application file for complete search history.

(56) References Cited

U.S. PATENT DOCUMENTS 3,626,270 A * 12/1971 Burkett et al. ................ 320/129
3,859,581 A * 1/1975 Gardner ......................... 388/843
4,123,693 A * 10/1978 Anderson et al. ............. 318/376

(Continued)

FOREIGN PATENT DOCUMENTS

| CN | 1475383 A | 2/2004 |
| CN | 101141070 A | 3/2008 |
| CN | 201553048 U | 8/2010 |
| CN | 201961169 U | 9/2011 |

*Primary Examiner* — Bentsu Ro
(74) *Attorney, Agent, or Firm* — Seed IP Law Group PLLC (57) ABSTRACT

An electrical system assembly of an electric automobile includes an energy system, a power system, and an instrument system. The energy system includes a battery module and a management module for managing the battery module; the power system includes a motor and a controller; the battery module includes a number of storage batteries connected in series and a solar panel for charging the storage batteries; and the storage batteries provide energy to the controller, controlling the motor through the controller. There is communication between the management module, the controller and the instrument system, thereby each of these is capable of knowing the working status of the other two, thus facilitating coordination and enabling a powerful protection function for the electrical system assembly of the electric automobile.

11 Claims, 10 Drawing Sheets

(56) References Cited

U.S. PATENT DOCUMENTS

| | | | |
|---|---|---|---|
| 5,451,880 A * | 9/1995 | Yamagishi et al. | 324/429 |
| 5,832,395 A | 11/1998 | Takeda et al. | |
| 7,884,569 B2 * | 2/2011 | Ward | 320/101 |
| 8,125,187 B2 * | 2/2012 | Tatsumi | 320/132 |

* cited by examiner

ELECTRICAL SYSTEM ASSEMBLY OF ELECTRIC AUTOMOBILE AND ENERGY SYSTEM AND ACTUATING DEVICE THEREOF

BACKGROUND

1. Technical Field

The present disclosure relates to an electrical system assembly of an electric automobile, and an energy system and an actuating device thereof.

2. Description of the Related Art

In modern lives, people are paying more and more attention to automobiles. Except for a few electric automobiles and hybrid electric automobiles, the vast majority of the automobiles employ fuel engines or gas engines as their power source which causes tremendous environmental contamination. Besides, with less and less energy, the fuel prices thereof are getting higher and higher, which causes the use costs of such automobiles are more and more expensive.

Generally, the electric automobile includes an electrical system assembly which is provided with batteries. The electrical system assembly of the electric automobile includes functional units of an energy system, a power system and an instrument system etc. The electric automobile may also include a solar panel which is used to provide energy to the batteries. The automobile with a solar device includes a vehicle body, a solar receiver device, a solar charging circuit and the batteries for storing energy. The solar device provides power to the batteries. Such solar device is controlled by the energy system in order to achieve better energy utilization. The power system includes a motor and a controller.

BRIEF SUMMARY

In current technologies, there is no communication between each functional unit of electric automobile, thus one functional unit does not know the working status of other functional units. When a certain functional unit experiences a problem, other functional units cannot coordinate with each other to protect the certain functional unit which has experienced the problem. As a result, the certain functional unit usually continues to deteriorate or simply disconnects the circuit. Besides, the current technologies lack of an energy feedback system, the energy wasted during the vehicle driving cannot be used to supplement the batteries as a result that the energy cannot be fully and effectively exploited. Furthermore, since each battery itself typically is composed of a plurality of single cells connected in series with each other, the whole energy supply of the electric automobile may suffer a serious problem if one of the batteries experiences a malfunction. If once a certain battery experiences a problem and it is not timely discovered and protected by the automotive system, the certain battery which has already experienced the problem is very likely to suffer further deterioration and finally to be broken.

An embodiment provides a new electrical system assembly of the electric automobile to facilitate addressing the above problems via such system assembly, and its energy system and actuating device.

In an embodiment, an electrical system assembly of an electric automobile has a better protection function.

In an embodiment, an electrical system assembly of an electric automobile includes an energy system, a power system and an instrument system. The energy system includes a battery module and a management module for managing the battery module. The power system includes a motor and a controller. The battery module includes a plurality of batteries in series connection with each other and a solar panel for charging the batteries. The batteries are adapted for providing energy to the controller and driving the motor via the controller. The management module, the controller and the instrument system establish communication with each other. The motor is controlled by the management module via the controller.

In an embodiment, the energy system includes the batteries, the solar panel and a battery charger. The solar panel and the battery charger are controlled by the management module to prevent the batteries from overcharging.

In an embodiment, the batteries provide energy to the controller under the control of the management module.

In an embodiment, the electrical system assembly of the electric automobile further includes an attachment appliance. The batteries output a part of energy to the attachment appliance so as to drive the attachment appliance under the control of the management module.

In an embodiment, the management module real-time monitors a current of the batteries, and a voltage and a temperature of each battery.

In an embodiment, the instrument system monitors a temperature and a revolution speed of the motor, and monitors a temperature and a current of the controller.

In an embodiment, the management module includes an equalization module for evenly charging and evenly discharging each battery.

In an embodiment, information of the batteries detected by the management module is displayed by the instrument system.

In an embodiment, an anomaly of the batteries detected by the management module is alarmed by the instrument system.

In an embodiment, the management module transforms a detected analog signal into a logic signal and then transmits the logic signal to a microcontroller for judgment. The motor is controlled by the controller according to a judgment result of the microcontroller.

In an embodiment, through establishing communication of the management module, the controller and the instrument system, the three functional units are capable of knowing the working status of each other for facilitating coordination, thereby enabling the electrical system assembly of the electric automobile to have a stronger protection function.

An embodiment provides an energy system of an electric automobile which is capable of monitoring and controlling electric energy.

In an embodiment, an energy system of an electric automobile includes a plurality of batteries in series connection with each other, a charging circuit for charging the batteries, a charging control module connected to the charging circuit and a detection module for monitoring each battery.

In an embodiment, the charging circuit includes a solar panel capable of charging the batteries, and a solar charging circuit connecting the batteries and the solar panel. The solar panel charges the batteries through the solar charging circuit.

In an embodiment, the charging circuit includes a mains battery charger connected between the batteries and the charging control module. The charging control module is configured to control the solar panel to charge the batteries and to control a mains supply to charge the batteries.

In an embodiment, the detection module includes a voltage detection module for real-time monitoring a voltage of each battery.

In an embodiment, the detection module includes a current detection module for real-time monitoring a current of the batteries.

In an embodiment, the detection module includes a temperature detection module for real-time monitoring a temperature of each battery.

In an embodiment, the detection module includes an insulation detection module for detecting insulativity of the electric automobile.

In an embodiment, the energy system of the electric automobile includes an equalization module to facilitate evenly charging and evenly discharging each battery.

In an embodiment, the energy system of the electric automobile further includes a central processing module to which information of each battery detected by the detection module is transmitted. The central processing module processes the acquired information and issues the command, and controls charging status of the batteries through the charging control module.

In an embodiment, by configuring the charging control module and the detection module to monitor the status of each battery, the control of charging the batteries is facilitated. Besides, by further setting the equalization module, once a malfunction or an anomaly of a certain single battery is detected, such certain single battery may be timely protected and prevented from further discharging so as to avoid finally deterioration and damage.

An embodiment includes an actuating device of an electric automobile which is capable of achieving energy recovery through monitoring a revolution speed of a motor.

In an embodiment, an electric automobile includes an actuating device, a motor, batteries for providing power to the motor, a detection module for monitoring a revolution speed of the motor, a control circuit connecting the detection module and a conversion circuit. When the detection module detects the revolution speed of the motor is reduced to a predetermined speed, a signal is transmitted to the control circuit. The control circuit further determines whether the motor is in a status of generator condition or not after receiving the signal. If yes, the motor starts to charge the batteries via the conversion circuit.

In an embodiment, the detection module monitors the revolution speed of the motor via a sensor.

In an embodiment, the detection module is adapted for detecting a vehicle speed and a throttle status. When the throttle status is detected to be fully closed and the vehicle speed is also reduced to a certain speed, the signal will be then sent to the control circuit.

In an embodiment, the conversion circuit includes a rectifier circuit to convert an output current of the motor into a direct current (DC).

In an embodiment, the conversion circuit includes a boost circuit and a voltage regulator circuit, wherein the boost circuit is used to enhance a voltage of the DC so as to be higher than a charging voltage of the batteries, and the voltage regulator circuit is used for maintaining the voltage difference between the voltage of the DC and the charging voltage of the batteries.

In an embodiment, the control circuit includes a logic circuit, a power circuit and a processing unit for judging whether the motor is in the status of generator condition or not.

In an embodiment, the batteries are connected with each other in series. The detection module is capable of real-time monitoring a current status of the batteries and a voltage of each battery.

In an embodiment, once an anomaly of the batteries is detected by the detection module, the revolution speed of the motor is capable of being controlled by the control circuit so as to protect the batteries.

In an embodiment, by monitoring the revolution speed of the motor and when the motor is in the status of generator condition, the output energy of the motor may be used to charge the batteries via the conversion circuit so as to achieve energy recovery purpose.

DETAILED DESCRIPTION

Figure 1:
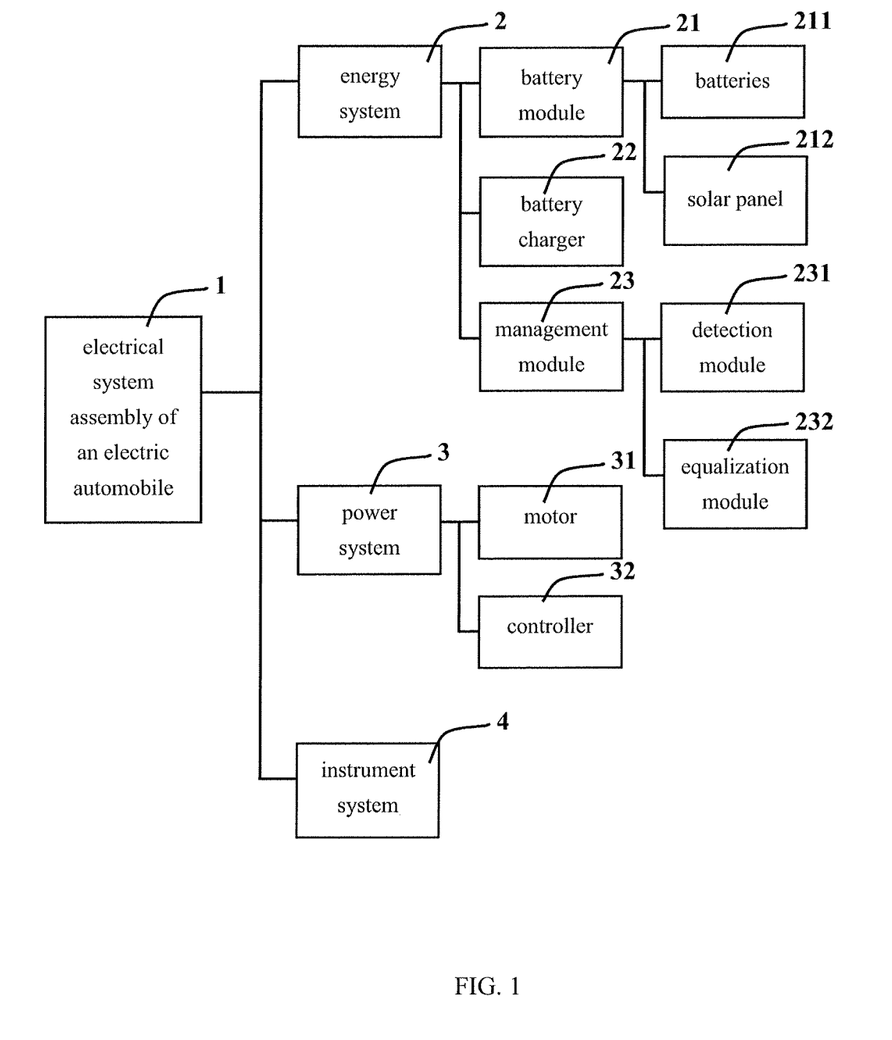
FIG. 1 is a schematic view of an electrical system assembly of an electric automobile in accordance with an illustrated embodiment.

Referring to FIG. 1, an electrical system assembly 1 of an electric automobile is shown. The electrical system assembly 1 includes an energy system 2, a power system 3 and an instrument system 4. The energy system 2 includes a battery module 21, a battery charger 22 and a management module 23 for managing the battery module 21 and the battery charger 22. The power system 3 includes a motor 31 and a controller 32.

Figure 2:
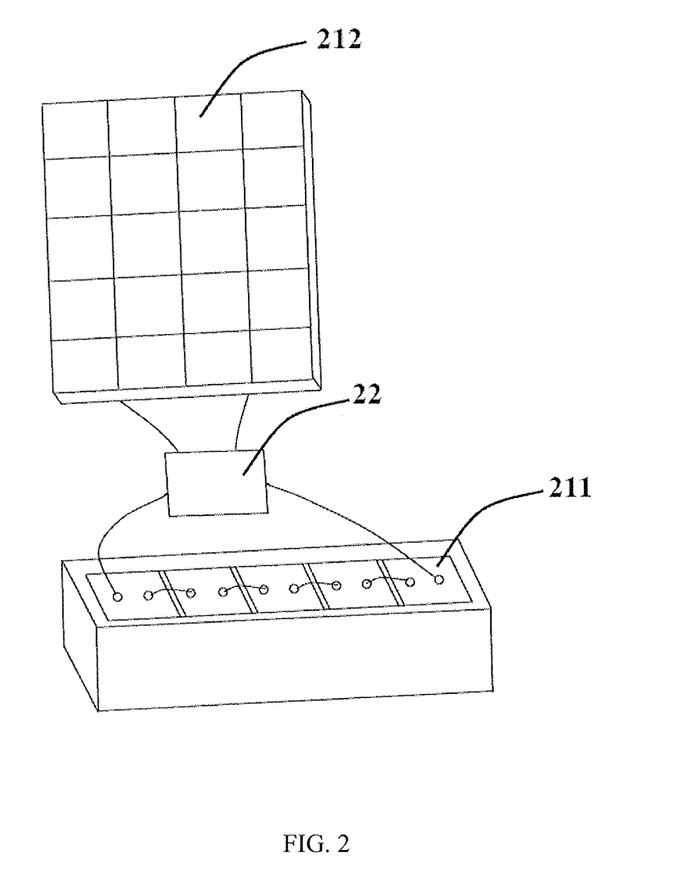
FIG. 2 is a schematic view of a solar panel, batteries and a battery charger connected with each other of the electric automobile in accordance with an illustrated embodiment.

Referring to FIG. 2, the battery module 21 includes a plurality of batteries 211 in series connection with each other and a solar panel 212 for charging the batteries 211. The battery charger 22 is connected between the batteries 211 and the solar panel 212. The battery charger 22 is under the control of the management module 23 (referring to FIGS. 1 and 3). Once the batteries 211 are found to have been fully charged, the charging circuit is switched off so as to prevent the batteries 211 from overcharging. Of course, the batteries 211 can also be charged by a mains supply. The batteries 211 in accordance with an embodiment are lithium batteries.

The solar panel 212 can be independently mounted on top of the electric automobile or can be mounted to other parts of the electric automobile, e.g., the engine hood, the roof, the trunk lid or the door etc. The solar panel 212 is a device which is capable of converting the light energy into the electric energy, for example through photoelectric effects or photochemical effects. As a result, a vehicle range of the electric automobile will be greatly increased by utilizing the renewable solar energy to charge the batteries 211 of the electric automobile. Such technology may realize energy conservation and environmental protection with reduced pollution.

Figure 3:
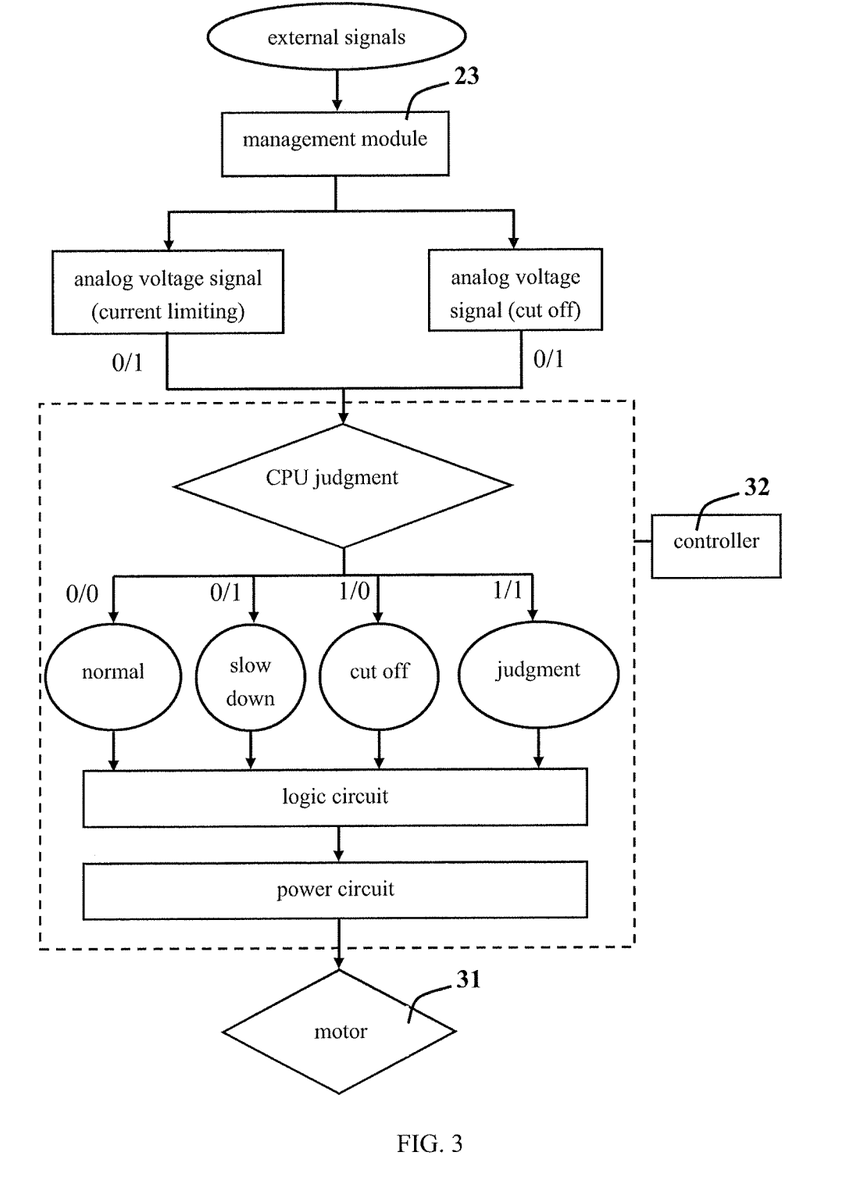
FIG. 3 is a schematic view of a management module and a controller for monitoring external signals.

The management module 23 includes a detection module 231 for monitoring the batteries 211 and an equalization module 232 for evenly charging and evenly discharging each battery 211. The detection module 231 is adapted for real-time monitoring a current of the batteries, and a voltage and a temperature of each battery 211. Besides, the instrument system 4 is capable of monitoring a temperature and a revolution speed of the motor 31, and a temperature and a current of the controller 32. The management module 23 is capable of real-time monitoring charging information and discharging information of each battery 211. Once an anomaly of a certain single battery 211 is detected (e.g., the voltage of certain single battery 211 is much lower than those of remaining batteries 211), an appropriate action (e.g., slow down or stop) of the electric automobile can be timely controlled through the controller 32. The advantage of this arrangement is as follows: once a malfunction or an anomaly of a certain battery 211 appears, such certain battery 211 is timely protected and prevented from further discharging so as to avoid finally deterioration and damage.

Referring to FIG. 3, an embodiment of the management module 23 is illustrated, which is capable of converting a detected external analog signal (e.g., charging or discharging stage information of each battery 211) into a logic signal (0/1), and then transmitting the logic signal to a microcontroller for judgment. In an embodiment, the logic signal includes an analog voltage signal (current limiting) and an analog voltage signal (cut off), wherein the analog voltage signal (current limiting) indicates whether it requires to limit the current supplied to the motor 31 so as to decelerate the electric automobile, and the analog voltage signal (cut off) indicates whether it requires to cut off the current supplied to the motor 31 so as to stop the electric automobile. In an embodiment, the analog voltage signal (current limiting) and the analog voltage signal (cut off) are simultaneously and respectively provided to the microcontroller for judgment. In an embodiment, if both the analog voltage signal (current limiting) and the analog voltage signal (cut off) are 0/0 signals, the judgment result of the microcontroller is 0/0, which means that everything is normal and there is no need to limit or cut off the current supplied to the motor 31. In an embodiment, if both the analog voltage signal (current limiting) and the analog voltage signal (cut off) are 0/1 signals, the judgment result of the microcontroller is 0/1, which means that the batteries 211 may appear an anomaly and there is a need to limit the current supplied to the motor 31 so as to decelerate the electric automobile. In an embodiment, if both the analog voltage signal (current limiting) and the analog voltage signal (cut off) are 1/0 signals, the judgment result of the microcontroller is 1/0, which means that the batteries 211 may appear an anomaly and there is a need to cut off the current supplied to the motor 31 so as to stop the electric automobile. In an embodiment, if both the analog voltage signal (current limiting) and the analog voltage signal (cut off) are 1/1 signals, the judgment result of the microcontroller is 1/1, which means that it requires a further judgment whether it is needed to limit or cut off the current supplied to the motor 31. However, regardless of any of the above judgment results, after the logic circuit and the power circuit, the motor 31 is controlled by the controller 32. Information of the batteries 211 detected by the management module 23 is displayed by the instrument system 4. Once a malfunction or an anomaly of the batteries 211 appears, the anomaly of the batteries 211 detected by the management module 23 is alarmed by the instrument system 4 and feeds back to the controller 32 so as to adjust the running status of the motor 31.

According to an illustrated embodiment, the batteries 211 are adapted for providing energy to the controller 32 under the control of the management module 23, and for driving the motor 31 through the controller 32. Besides, the electrical system assembly 1 of the electric automobile further includes an attachment appliance (e.g., lights). The batteries 211 output a part of energy to the attachment appliance so as to drive the attachment appliance under the control of the management module 23.

Figure 4:
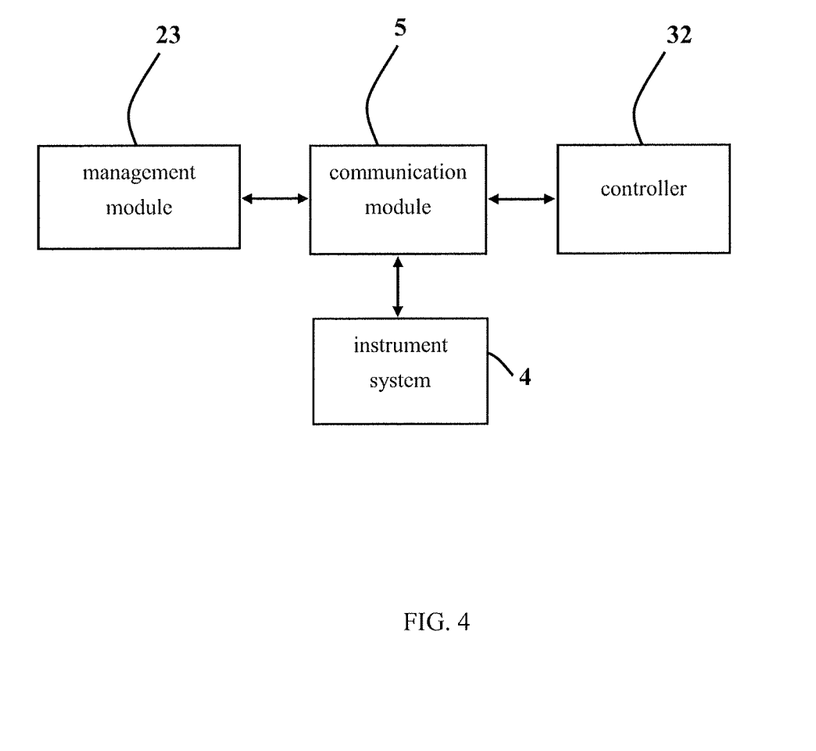
FIG. 4 is a schematic view of established communication among the management module, the controller and an instrument system.

Referring to FIG. 4, a communication module 5 is provided in order to establish communication among the management module 23, the controller 32 and the instrument system 4. The benefit of this arrangement is as follows: each of the three functional units are capable of knowing the working status of each other for facilitating coordination, thereby enabling the electrical system assembly 1 of the electric automobile to have a strong protection function. The motor 31 is controlled by the management module 23 via the controller 32. When a certain functional unit occurs an anomaly, other functional units will be coordinated so as to protect the certain functional unit rather than allowing the situation to deteriorate or simply disconnecting the circuit.

Figure 5:
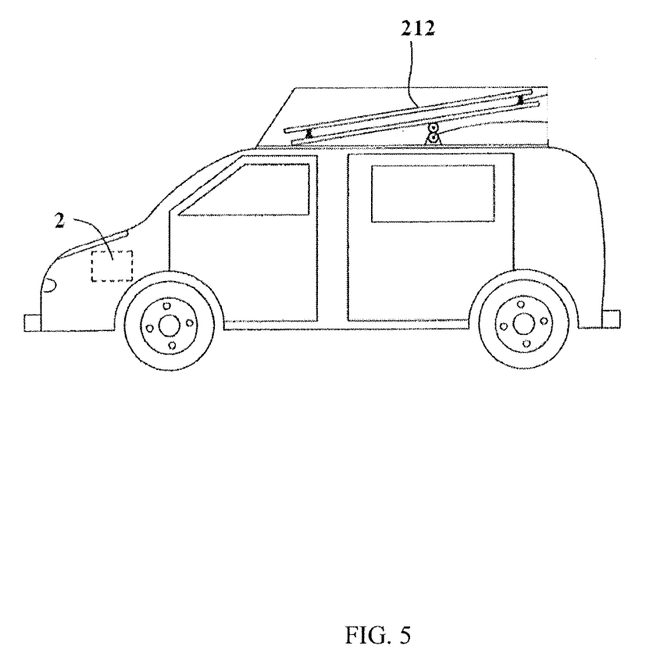
FIG. 5 is a schematic side view of a related electric automobile in accordance with an illustrated embodiment.
Figure 6:
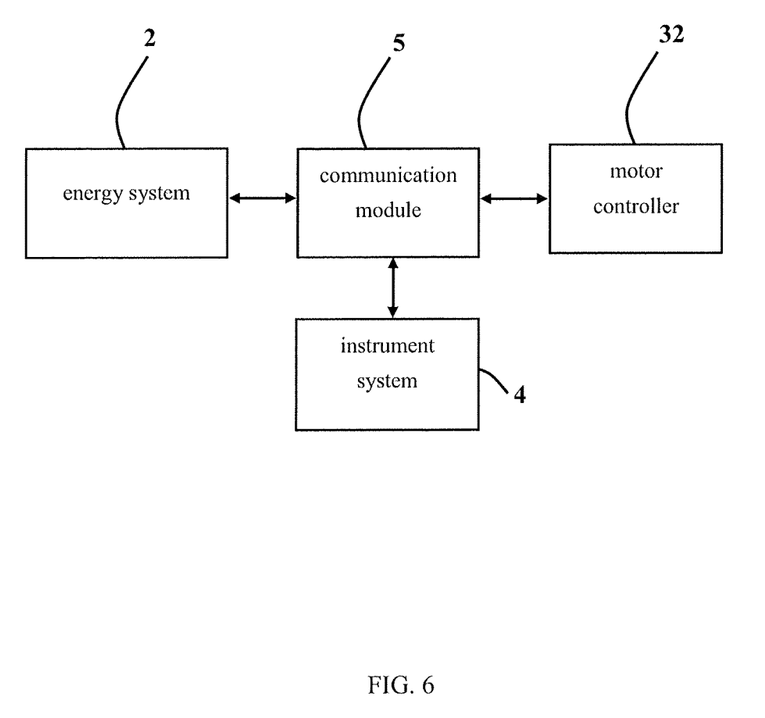
FIG. 6 is a schematic view of major components in accordance with an illustrated embodiment.

Referring to FIGS. 5 and 6, an embodiment of an electric automobile includes a vehicle body, an energy system 2 mounted to the vehicle body, a motor controller 32 and an instrument system 4. The energy system 2, the motor controller 32 and the instrument system 4 establish communication with each other, and thus enabling exchanging information.

Figure 7:
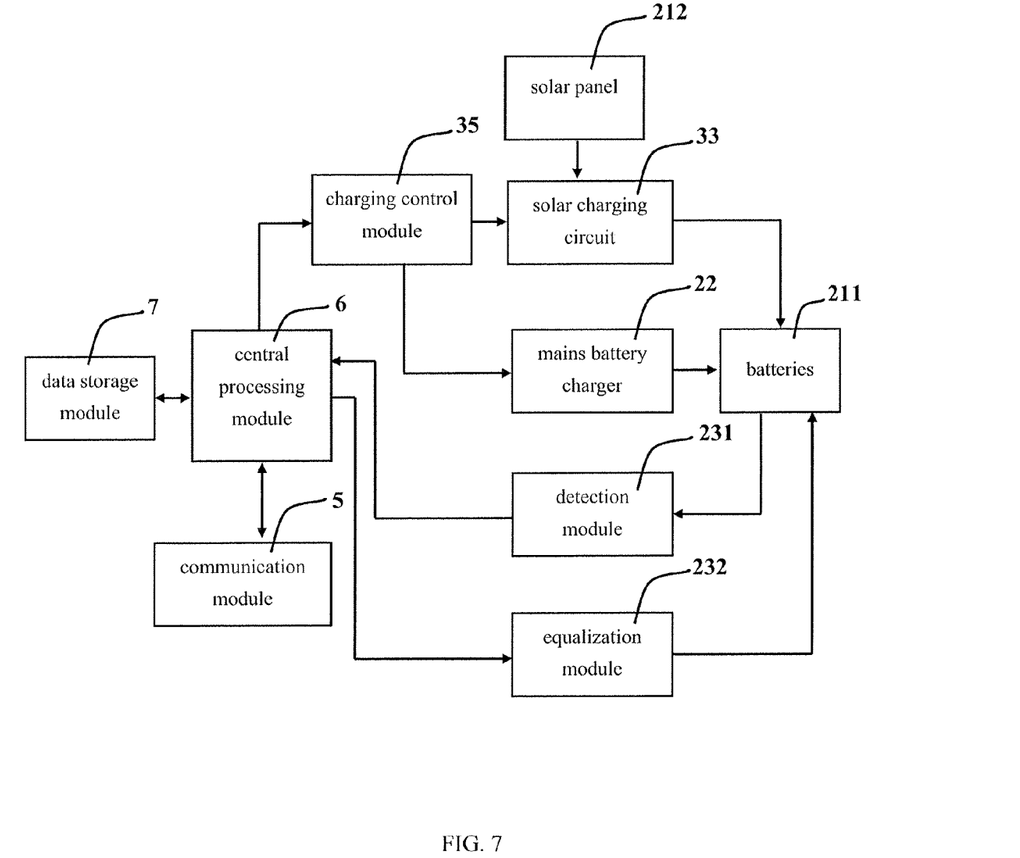
FIG. 7 is a schematic view of an energy system in accordance with an illustrated embodiment.

Referring to FIG. 7, the energy system 2 includes a plurality of batteries 211 in series connection with each other, a solar panel 212 connecting the batteries 211, a solar charging circuit 33 connecting the batteries 211 and the solar panel 212, a mains battery charger 22, a charging control module 35 connecting the mains battery charger 22 and the solar charging circuit 33, a detection module 231 for monitoring the batteries 211, an equalization module 232 for evenly charging and evenly discharging each battery 211, a central processing module 6 for collecting charging and discharging information of the batteries 211, and a data storage module 7.

The batteries 211 are connected to the mains battery charger 22, and the batteries 211 are capable of being charged by a mains supply. Certainly, since a withstand voltage of the batteries 211 may be different from a mains voltage, the mains battery charger 22 includes a mains charging circuit (not shown) for being capable of adjusting the mains voltage. The mains battery charger 22 can be integrated in the electric automobile or externally connected to the electric automobile.

Figure 8:
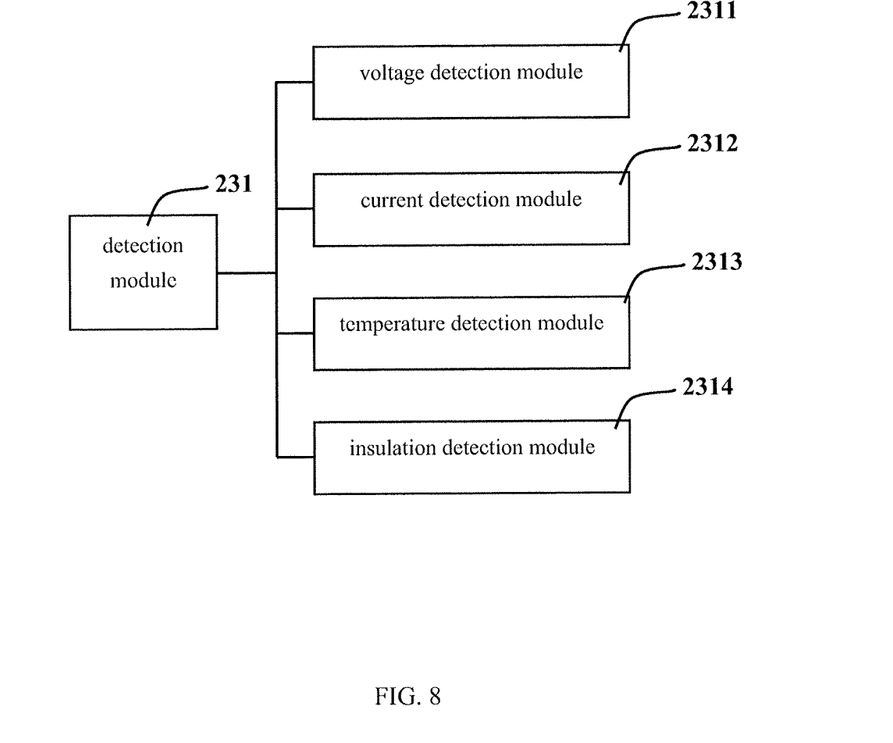
FIG. 8 is a schematic view of a detection module in accordance with an illustrated embodiment.

Referring to FIGS. 7 and 8, the detection module 231 includes a voltage detection module 2311, a current detection module 2312, a temperature detection module 2313 for respectively real-time monitoring the voltage, the current and the temperature of each battery 211, and an insulation detection module 2314 for detecting insulativity of the electric automobile.

In an illustrated embodiment, the detection module 231 is capable of real-time monitoring the voltage, the current and the temperature of the batteries 211, and then sends the monitoring signal to the central processing module 6. The central processing module 6 compares the voltage, the current and the temperature with corresponding threshold values (which may be present) so as to determine whether or not the charging circuit or the discharging circuit should be turned on or turned off. As a result, the voltage, the current and the temperature of the batteries 211 can be prevented from being neither too high nor too low, which avoids the impact of the battery performance and the running motor.

Besides, the detection module 231 is capable of real-time monitoring a current value of the battery pack and a voltage of each battery 211, and transmitting the detected voltage and current information to the central processing module 6. Under this arrangement, once a certain battery 211 is found by the central processing module 6 through a comparison judgment to occur an anomaly (e.g., the voltage of the certain battery 211 is much lower than those of remaining batteries 211), the central processing module 6 is capable of issuing a command and controlling corresponding action (e.g., deceleration) of the electric automobile via the motor controller 32. The benefit of this arrangement is as follows: once a malfunction or an anomaly of a certain battery 211 is detected, such certain battery 211 is protected and prevented from further discharging so as to avoid finally deterioration and damage.

The insulation detection module 2314 of the detection module 231 is capable of detecting whether the batteries 211 transmit electric quantity to the vehicle body. Through connecting a detection end of the insulation detection module 2314 to the metal part of the vehicle body, when the batteries 211 are wrongly connected to the vehicle body, the insulativity can be detected out by the insulation detection module 2314 via the voltage or the current. The monitoring signal is transmitted to the central processing module 6, and the central processing module 6 issues a display signal prompted to the instrument system 4 via the communication module 5 so as to avoid the electric shock of the user.

In the illustrated embodiment, both the solar panel 212 and the mains supply can be used to charge the batteries 211. According to different parameter settings of the energy system 2, the batteries 211 can be controlled under what state to be charged by the solar panel 212. The charging control module 35 is capable of controlling the solar panel 212 to charge the batteries 211 so as to prevent the batteries 211 from overcharging and thus protect the batteries 211. Certainly, the charging control module 35 is also capable of preventing the batteries 211 from overcharging when the batteries 211 are charged by the mains supply. Under condition when the batteries 211 are charged by both the solar panel 212 and the mains supply, the charging control module 35 monitors the voltage of the batteries 211. Once the batteries 211 have been fully charged, the charging circuits are switched off to prevent the batteries from overcharging.

The equalization module 232 is adapted for evenly charging and evenly discharging each battery 211. When the voltage of a certain single battery 211 is detected by the detection module 231 to be lower than those of remaining batteries 211, such signal will be then transmitted to the central processing module 6, thereby enhancing the efficient use of the entire batteries 211 after being processed by the equalization module 232.

The data storage module 7 is adapted for storing trouble signal of the electric automobile and alarm for easy access.

The energy system 2 further includes a communication module 5 (e.g., a CAN communication module of the present embodiment) in order to establish communication among the central processing module 6, the motor controller 32 and the instrument system 4.

Figure 9:
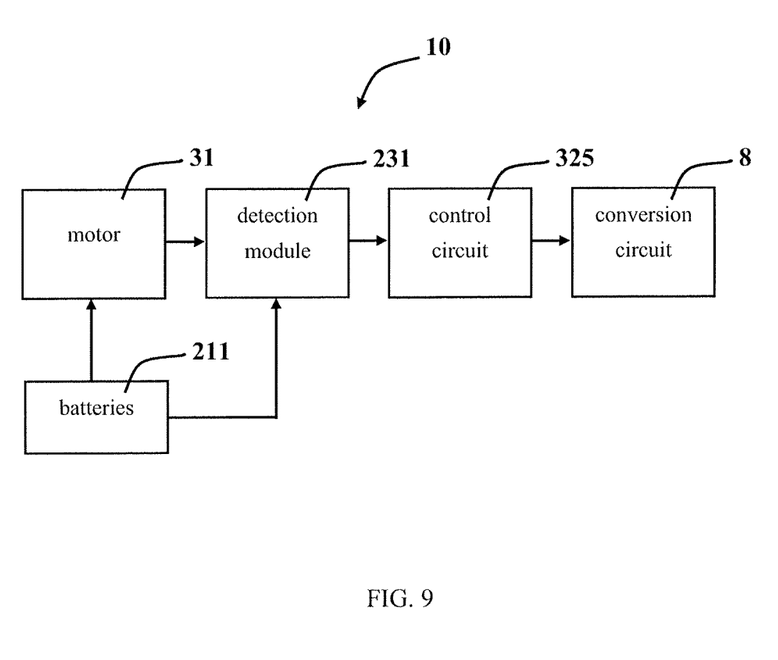
FIG. 9 is a schematic view of composition modules of an actuating device in accordance with an illustrated embodiment.

Referring to FIG. 9, an embodiment includes an actuating device 10 of an electric automobile. The actuating device 10 includes a motor 31, a plurality of batteries 211 for providing energy to the motor 31, a detection module 231 for monitoring a revolution speed of the motor 31, a control circuit 325 connecting the detection module 231 and a conversion circuit 8.

Through setting different models of the actuating device 10, it is suitable for either when the motor 31 is as a DC motor or as an AC motor, and the actuating device 10 can be freely converted between a permanent magnet synchronous type and a DC brushless type.

Figure 10:
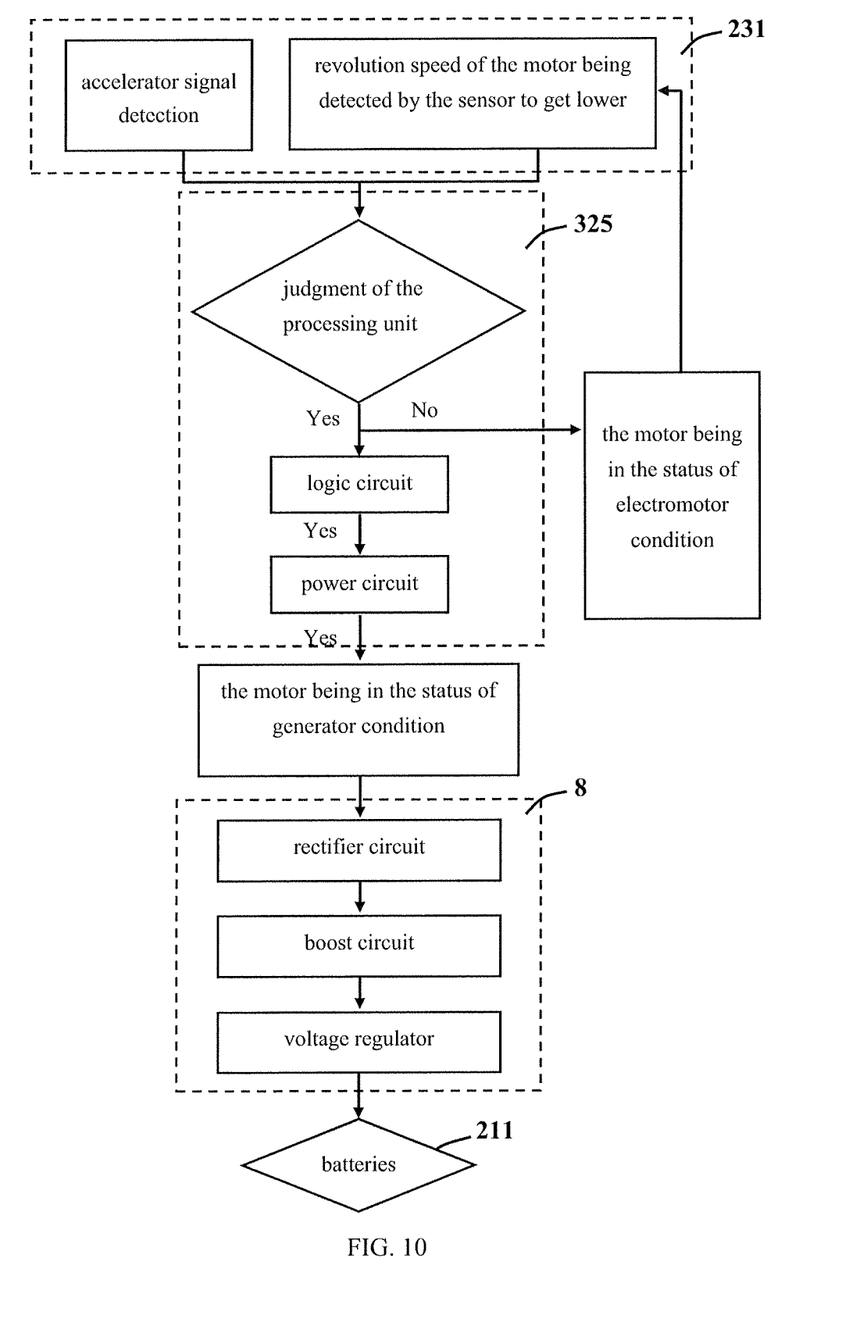
FIG. 10 is a schematic view of an energy recovery system of the actuating device in accordance with an illustrated embodiment.

Referring to FIGS. 9 and 10, the detection module 231 is adapted for monitoring the motor 31. In an embodiment, the detection module 231 monitors the revolution speed of the motor 31 via a sensor. When the revolution speed of the motor 31 is detected to decelerate to a preset revolution speed, a signal will be then sent to the control circuit 325 and the control circuit 325 will further judge whether the motor 31 is in the status of generator condition or not. In the illustrated embodiment, the detection module 231 includes another detecting part, e.g., detecting the acceleration signals (including the vehicle speed and the throttle/switch signals). When the detection module 231 detects the throttle is fully closed and the vehicle speed is also reduced to a certain speed (e.g., when the electric automobile is during a downhill state or a brake state), in this case, the detection module 231 will then send a signal to the control circuit 325.

Referring to FIG. 10, the control circuit 325 can be set inside the controller. The control circuit 325 includes a logic circuit, a power circuit and a processing unit for judging whether the motor 31 is in the status of generator condition or not. If the conclusion of the processing unit is "Yes", the signal is then transmitted to the logic circuit for further judgment. If the conclusion of the processing unit is "No", the motor 31 is judged to be in the status of electromotor condition, a step returns back to the detection module 231 to continue to monitor. If the conclusion of the logic circuit is also "Yes", the signal is then transmitted to the power circuit for further judgment. Under this condition, if the conclusion of the power circuit is "Yes" as well, then the motor 31 is judged by the control circuit 325 to be the status of generator condition, e.g., during a downhill state etc. Once the motor 31 is judged by the control circuit 325 to be the status of generator condition, energy feedback will be activated so that the motor 31 charges the batteries 211 via the conversion circuit 8 to achieve energy recovery purpose. In such process, the conversion circuit 8 includes a rectifier circuit for converting an output current of the motor 31 into a DC, a boost circuit for enhancing a voltage of the DC to be higher than a charging voltage of the batteries 211, and a voltage regulator circuit for maintaining the voltage difference between the voltage of the DC and the charging voltage of the batteries 211.

Besides, the detection module 231 is capable of actively detecting the charging information and the discharging information of each battery 211, once the batteries 211 occur an anomaly, the control circuit 325 is enable to protect the batteries 211 via controlling the revolution speed of the motor 31. For example, if the detection module 231 finds that the voltage of a certain battery 211 is only two volts while the voltages of the remaining batteries 211 are about five volts, under this condition, the detection module 231 will preliminarily judge that the two-volt battery 211 occurs an anomaly of discharging too fast. Such anomaly will be transmitted to the control circuit 325 to further determine whether it is needed to immediately cut off the power supply or maintain the discharging state of the battery 211 at a lower value (such as one volt), in order to protect the battery 211. If the battery 211 continues to discharge and is less than one volt, the power supply will be cut off by the control circuit 325 to stop the electric automotive. If after a period of recovery, the voltage of the anomaly battery 211 rises to the similar voltages of the remaining batteries 211, the anomaly condition is removed and the detection module 231 continues to monitor.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electrical system assembly of an electric automobile comprising:
   an energy system comprising a battery module and a management module configured to manage the battery module, the battery module comprising a plurality of batteries in series connection with each other and a solar panel to charge the batteries, the management module being configured to monitor in real-time a current of the batteries, and a voltage and a temperature of each battery to detect battery anomalies, and to generate control signals in response to detection of an anomaly in a battery to prevent further discharging or overcharging of the battery;
   a power system comprising a motor and a controller; and
   an instrument system; wherein
   the batteries are adapted to provide energy to the controller and drive the motor via the controller;
   the management module, the controller and the instrument system establish communication with each other to respond to an occurrence of an anomaly of one of the management module, the controller and the instrument system; and
   the motor is controlled by the management module via the controller.

2. The electrical system assembly of the electric automobile as claimed in claim 1, wherein the energy system comprises the batteries, the solar panel and a battery charger, the management module being configured to control the solar panel and the battery charger to prevent the batteries from overcharging, the batteries providing energy to the controller under the control of the management module.

3. The electrical system assembly of the electric automobile as claimed in claim 1, wherein the instrument system is configured to monitor a temperature and a revolution speed of the motor, and a temperature and a current of the controller.

4. The electrical system assembly of the electric automobile as claimed in claim 1, wherein the management module comprises an equalization module to evenly charge and evenly discharge each battery.

5. The electrical system assembly of the electric automobile as claimed in claim 4, wherein the instrument system is configured to display information of the batteries detected by the management module, and to alarm an anomaly of the batteries detected by the management module.

6. The electrical system assembly of the electric automobile as claimed in claim 1, wherein the management module is configured to transform a detected analog signal into a logic signal and to transmit the logic signal to a microcontroller for judgment, the motor being controlled by the controller according to a judgment result of the microcontroller.

7. The electrical system assembly of the electric automobile as claimed in claim 6, wherein the logic signal comprises a first analog voltage signal which indicates whether to limit a current supplied to the motor so as to decelerate the electric automobile, and a second analog voltage signal which indicates whether to cut off the current supplied to the motor so as to stop the electric automobile.

8. The electrical system assembly of the electric automobile as claimed in claim 7, wherein if the first analog voltage signal and the second analog voltage signal are 0/0 signals, the judgment result of the microcontroller is 0/0, which means that there is no need to limit or cut off the current supplied to the motor.

9. The electrical system assembly of the electric automobile as claimed in claim 8, wherein if the first analog voltage signal and the second analog voltage signal are 0/1 signals, the judgment result of the microcontroller is 0/1, which means that the batteries may appear an anomaly and there is a need to limit the current supplied to the motor so as to decelerate the electric automobile.

10. The electrical system assembly of the electric automobile as claimed in claim 9, wherein if the first analog voltage signal and the second analog voltage signal are 1/0 signals, the judgment result of the microcontroller is 1/0, which means that the batteries may appear an anomaly and there is a need to cut off the current supplied to the motor so as to stop the electric automobile.

11. The electrical system assembly of the electric automobile as claimed in claim 10, wherein if the first analog voltage signal and the second analog voltage signal are 1/1 signals, the judgment result of the microcontroller is 1/1, which means that it requires a further judgment whether it is needed to limit or cut off the current supplied to the motor.

* * * * *